United States Patent
Shirase et al.

(10) Patent No.: US 7,168,679 B2
(45) Date of Patent: Jan. 30, 2007

(54) ELECTROMAGNETIC VALVE (75) Inventors: Takaomi Shirase, Nagano-ken (JP); Yoshiyuki Takamatsu, Nagano-ken (JP); Masaya Shigeta, Nagano-ken (JP)

(73) Assignee: Nissin Kogyo Co., Ltd., Nagano-Ken (JP)

( * ) Notice: Subject to any disclaimer, the term of this patent is extended or adjusted under 35 U.S.C. 154(b) by 216 days.

(21) Appl. No.: 10/858,477

(22) Filed: Jun. 2, 2004

(65) Prior Publication Data
US 2005/0001190 A1 Jan. 6, 2005

(30) Foreign Application Priority Data
Jun. 3, 2003 (JP) ............ P.2003-157911

(51) Int. Cl.
*F16K 31/02* (2006.01)
(52) U.S. Cl. .................. 251/129.02; 251/333
(58) Field of Classification Search ........... 251/129.15, 251/129.02, 333
See application file for complete search history.

(56) References Cited

U.S. PATENT DOCUMENTS

| | | | |
|---|---|---|---|
| 5,603,483 A | 2/1997 | Reuter et al. | |
| 5,984,432 A * | 11/1999 | Otomo et al. | 303/119.2 |
| 6,086,164 A * | 7/2000 | Oehler et al. | 303/119.2 |
| 6,092,781 A * | 7/2000 | Hohl et al. | 251/129.02 |
| 6,113,066 A * | 9/2000 | Hohl et al. | 251/129.02 |
| 6,318,703 B1 * | 11/2001 | Goossens et al. | 251/129.15 |
| 6,523,913 B1 | 2/2003 | Lauer et al. | |
| 6,755,390 B2 * | 6/2004 | Masuda et al. | 251/129.15 |
| 2002/0179874 A1 | 12/2002 | Hofmann et al. | |
| 2004/0251441 A1 * | 12/2004 | Schmitt et al. | 251/129.07 |

FOREIGN PATENT DOCUMENTS

| | | |
|---|---|---|
| DE | 100 36 576 A1 | 2/2002 |
| DE | 100 36 577 A1 | 2/2002 |
| DE | 10 47 399 A1 | 4/2002 |
| EP | 0 864 477 | 9/1998 |
| JP | 747943 | 2/1995 |
| JP | 9159044 | 6/1997 |
| JP | 2745339 | 2/1998 |
| JP | 1130342 | 2/1999 |
| JP | 1177223 | 3/1999 |
| JP | 11108230 | 4/1999 |
| JP | 2002-502771 | 1/2002 |

(Continued)

OTHER PUBLICATIONS

European Office Action dated Sep. 16, 2005 for counterpart application serial No. 04 013 131.2-1252.

(Continued)

*Primary Examiner*—John Bastianelli
(74) *Attorney, Agent, or Firm*—Greenblum & Bernstein, P.L.C.

(57) ABSTRACT

An electromagnetic valve comprising has a valve seat, a valve element movable relative to the valve seat so as to open or close a hydraulic fluid passage interposed therebetween and a plunger movable together with the valve element relative to the valve seat, wherein the valve element includes a sealing portion having an arc-shaped vertical cross section that contacts with the valve seat and an expanding diameter portion having a diameter gradually increasing in a direction from the sealing portion toward the plunger.

20 Claims, 6 Drawing Sheets

FOREIGN PATENT DOCUMENTS

JP    2002-347597    12/2002
WO    9941121    9/1999

OTHER PUBLICATIONS

European Search Report dated Sep. 21, 2004.
English Language Abstract of JP-A-11-30342.
English Language Abstract of JP-A-7-47943.
English Language Abstract of JP-A-9-159044.
English Language Abstract of JP-A-11-77223.
Japanese Utility Model Unexamined Publication 64-29811, Concise Explanation dated Feb. 22, 1989.
English Language Abstract of JP-A-11-108230.

* cited by examiner

ELECTROMAGNETIC VALVE

The present invention claims foreign priority to Japanese patent application no.2003-157911, filed on Jun. 3, 2003, the contents of which is incorporated herein by reference.

BACKGROUND OF THE INVENTION

1. Field of the Invention

The present invention relates to an electromagnetic valve provided with a valve element for opening and closing a hydraulic fluid passage.

2. Description of the Related Art

Generally, electromagnetic valves (solenoid valves) for opening and closing a hydraulic fluid passage are broadly divided into a normally close type electromagnetic valve which is normally closed but opens by excitation of a fixed core when current is supplied to a coil, and a normally open type electromagnetic valve which is normally open but closes by excitation of a fixed core when current is supplied to a coil. These electromagnetic valves are provided with a valve seat for defining a hydraulic fluid passage and a valve element capable of contacting with or separating from the valve seat. The valve element can close the hydraulic fluid passage by contacting with the valve seat, and open the hydraulic fluid passage by separating from the valve seat.

Figure 5:
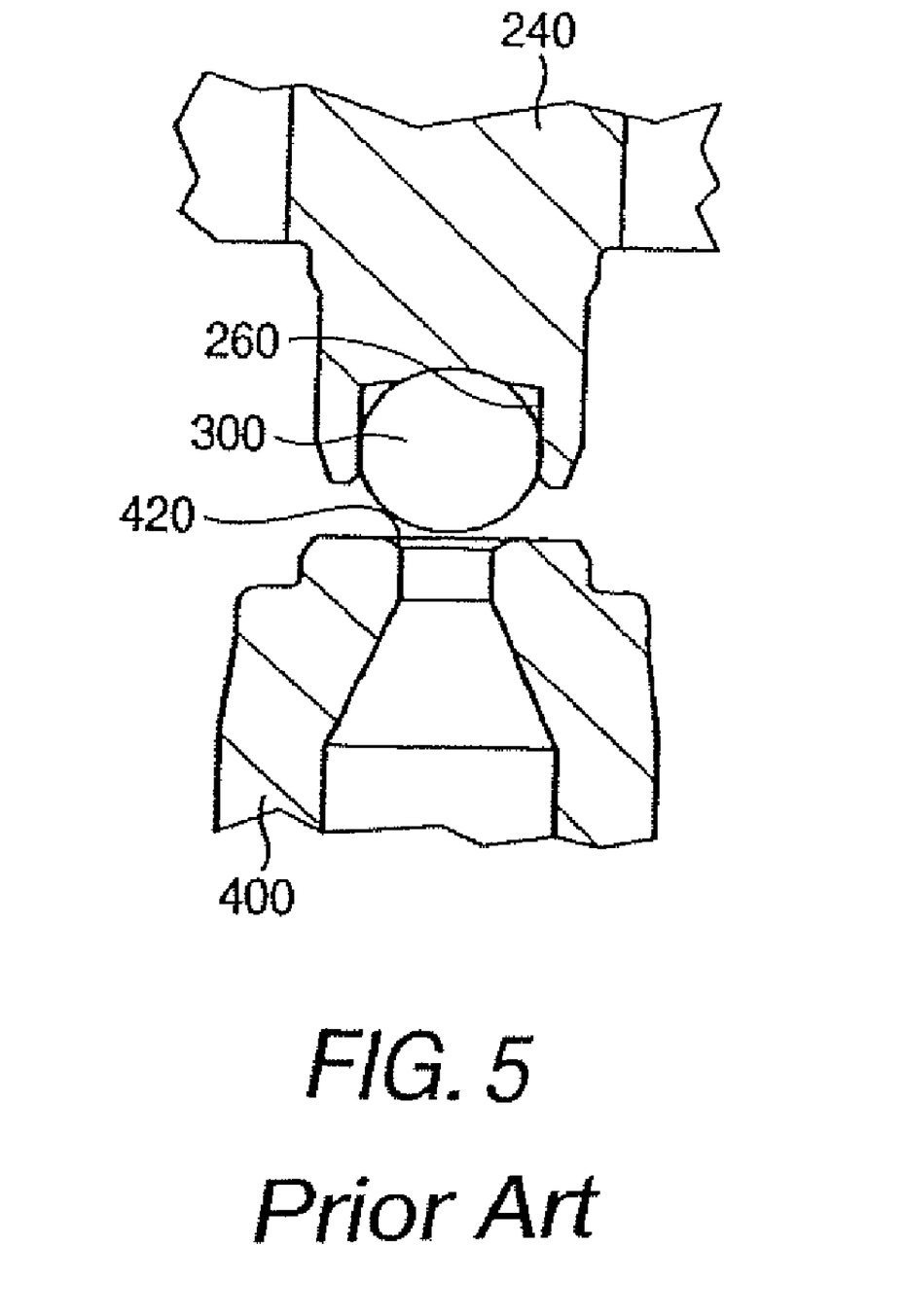
FIG. 5 is a fragmentary vertical cross-sectional view showing a mounting structure of a valve element of a conventional electromagnetic valve.

FIG. 5 shows an example of such an electromagnetic valve, which is provided with a spherical valve element 300 fixed in a plunger 240 (See Japanese Patent Examined Publication JP-B-2745339). The spherical valve element 300 is attached to the plunger 240 by first press-fitting the spherical valve element 300 into a circular recess 260 disposed at a tip portion of the movable plunger 240 (a movable core in a normally close type electromagnetic valve; a retainer in a normally open type electromagnetic valve), and then by fixing the tip portion of the plunger 240 against the spherical valve element 300. Since such an electromagnetic valve is provided with a small-diameter valve element, a seating area diameter on the valve seat 420 can be reduced, thereby permitting energy saving and miniaturization of a coil for activating the valve element.

However, since the tip portion of the plunger 240 has to be fixed to enclose the spherical valve element 300, there is inevitably a technical limit in reducing the diameter of the spherical valve element 300, because of interference with the valve seat element 400. To be more specific, the tip portion of the plunger 240 has to enclose more than half a height of the spherical valve element 300, and furthermore the tip portion has to have a sufficient thickness for the fixing process. Therefore, in a case where the spherical valve element 300 becomes smaller than a certain limit, the tip portion of the plunger 240 interferes with the valve seat element 400.

Figure 6:
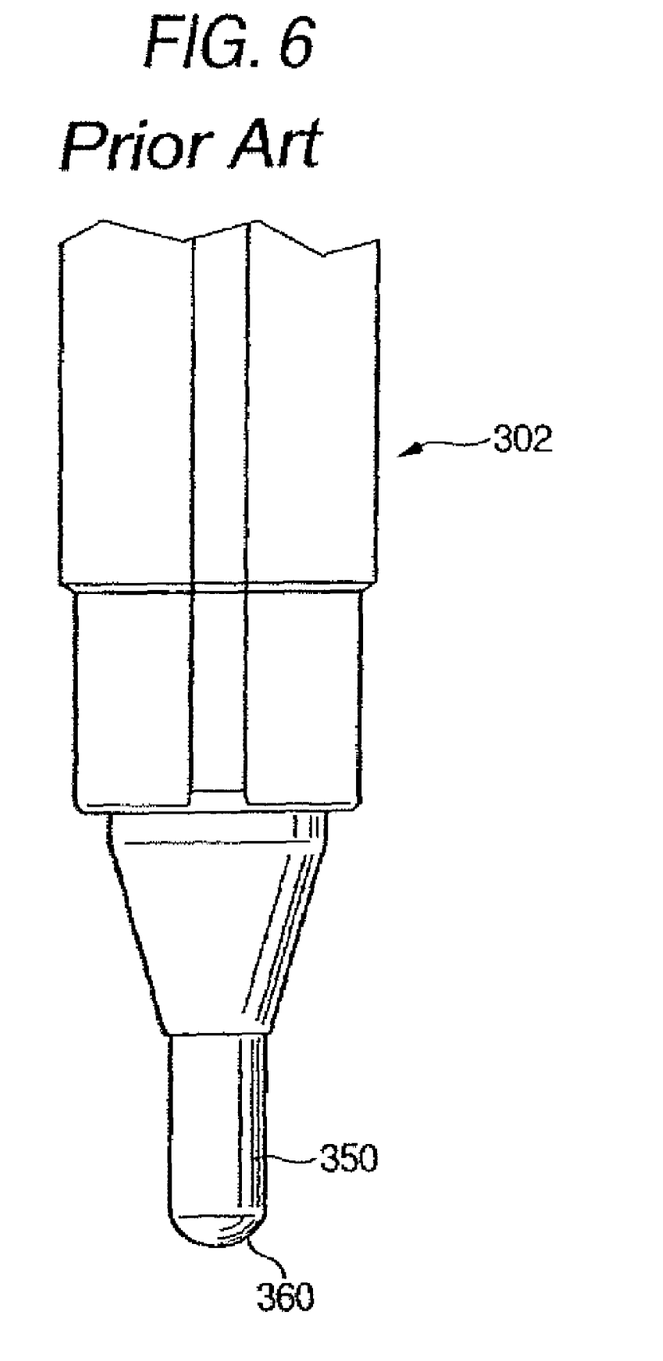
FIG. 6 is a front view showing a valve element of a conventional electromagnetic valve.

Also, FIG. 6 shows a valve element 302 made of a PEEK (polyether-etherketon) resin provided with a valve element and a plunger formed in a unified body (See Japanese Patent Unexamined Publication JP-A-2002-347597). The valve element 302 unified with the plunger includes a shaft portion 350 of a circular column shape and a semi-spherical sealing portion 360 formed at a tip thereof. However, forming such a valve element 302 requires processing precision applicable to a plunger which slides back and forth in a fixed core, as well as to a valve element which has to ensure a sealing effect be making contact with a valve seat with reduced operational noise. Therefore, process control is required for fulfilling the precision in both aspects, however such control was quite troublesome.

SUMMARY OF THE INVENTION

Accordingly, it is an object of the present invention to provide an electromagnetic valve provided with a valve element having a reduced seating area diameter on a valve seat so as to permit miniaturization of the valve. Also, it is another object of the present invention to provide an electromagnetic valve that suppresses operational noise.

For achieving the foregoing object, a first aspect of the present invention provides an electromagnetic valve having a valve seat, a valve element movable relative to the valve seat so as to open or close a hydraulic fluid passage interposed therebetween and a plunger movable together with the valve element relative to the valve seat, wherein the valve element includes a sealing portion having an arc-shaped vertical cross section that contacts with the valve seat and an expanding diameter portion having a diameter gradually increasing in a direction from the sealing portion toward the plunger.

According to a second aspect of the present invention according to the first aspect of the present invention, wherein the expanding diameter portion of the valve element has a tapered face having a diameter increasing in a direction from the sealing portion toward the plunger.

According to a third aspect of the present invention according to the first aspect of the present invention, wherein the plunger includes a joint portion opened at a tip portion thereof and the valve element further includes a joint shaft portion press-fitted into the joint portion; and a flange portion that protrudes radial direction and is located between the joint shaft portion and the expanding diameter portion.

According to a fourth aspect of the present invention according to the third aspect of the present invention, wherein a maximum diameter of the joint shaft portion is smaller than a maximum diameter of the expanding diameter portion.

According to a fifth aspect of the present invention according to the first aspect of the present invention, wherein the electromagnetic valve is a normally open type electromagnetic valve including a conductive coil, a fixed core to be excited upon supplying current to the coil, a movable core that is adsorbed to the fixed core upon supplying current to the coil and a biasing member located between the valve seat and the valve element, wherein the plunger serves as a retainer that slides along a valve bore penetrating through the fixed core, the valve element is normally separated from the valve seat by the biasing member, and the valve element contacts with the valve seat when the retainer is pressed by the adsorption of the movable core.

According to a sixth aspect of the present invention according to the fifth aspect of the present invention, wherein the retainer includes a through hole that penetrates axially therethrough and joint portions formed at the both ends of the through hole, each joint portion capable of coupling with the valve element, wherein the joint portions are symmetrical to an axial center of the retainer.

According to a seventh aspect of the present invention according to the first aspect of the present invention, wherein the electromagnetic valve is a normally close type electromagnetic valve including a conductive coil, a fixed core to be excited upon supplying current to the coil and a biasing member disposed between the movable core and the fixed core, wherein the plunger serves as a movable core, the valve element is normally in contact with the valve seat by the biasing member, and the valve element is separated from the valve seat when the movable core is adsorbed to the fixed core by supplying current to the coil.

According to an eighth aspect of the present invention according to the first aspect of the present invention, wherein the plunger is made of a first material, and the valve element is made of a second material that is different from the first material.

According to a ninth aspect of the present invention according to the first aspect of the present invention, wherein the expanding diameter portion of the valve element has an arc-shaped surface having a various diameter increasing in a direction from the sealing portion toward the plunger.

According to a tenth aspect of the present invention according to the second aspect of the present invention, wherein the tapered surface is constructed with surfaces that forms different opening angles each other.

According to an eleventh aspect of the present invention according to the second aspect of the present invention, wherein an opening angle of the tapered surface is 40 degrees.

According to a twelfth aspect of the present invention according to the fifth aspect of the present invention, wherein the plunger includes a joint portion opened at a tip portion thereof, and the valve element further includes a joint shaft portion press-fitted into the joint portion; and a flange portion that protrudes radial direction thereof and is located between the joint shaft portion and the expanding diameter portion, wherein a surface of the flange portion that opposes to the valve seat contacts with the biasing member.

DETAILED DESCRIPTION OF THE PREFERRED EMBODIMENT

Referring to the accompanying drawings, embodiments of the present invention will be described hereunder.

Figure 1:
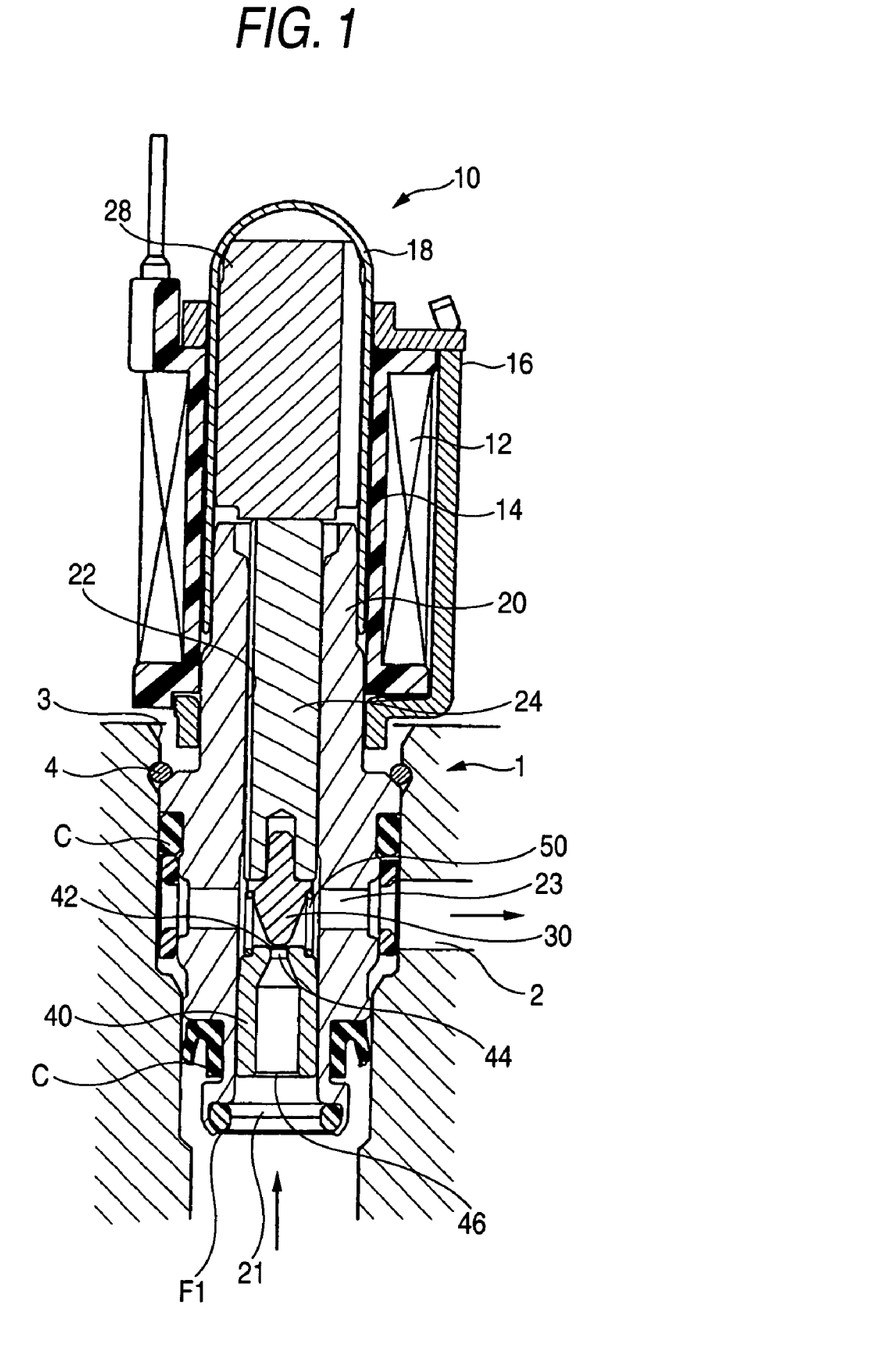
FIG. 1 is a vertical cross-sectional view showing a normally open type electromagnetic valve according to an embodiment of the present invention.
Figure 2A:
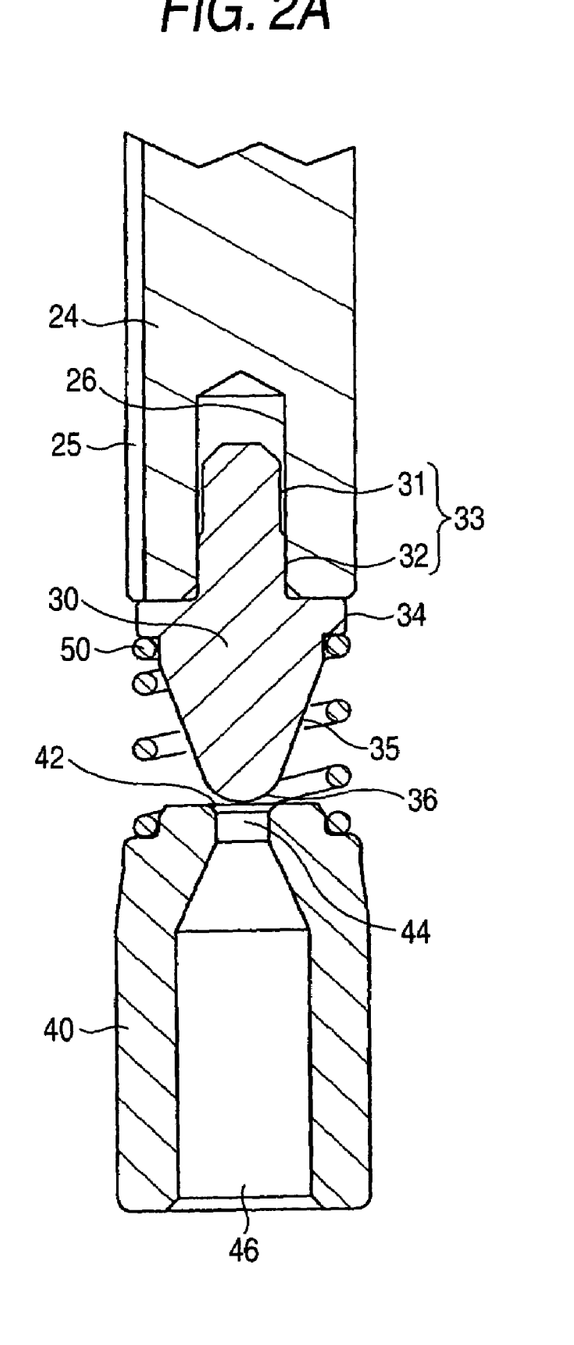
FIG. 2A is an enlarged vertical cross-sectional view showing a valve element and a valve seat.
Figure 2B:
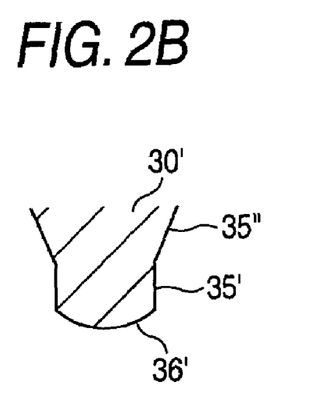
FIG. 2B is an enlarged vertical cross-sectional view showing a valve element that has surfaces having first and second opening angle.
Figure 3:
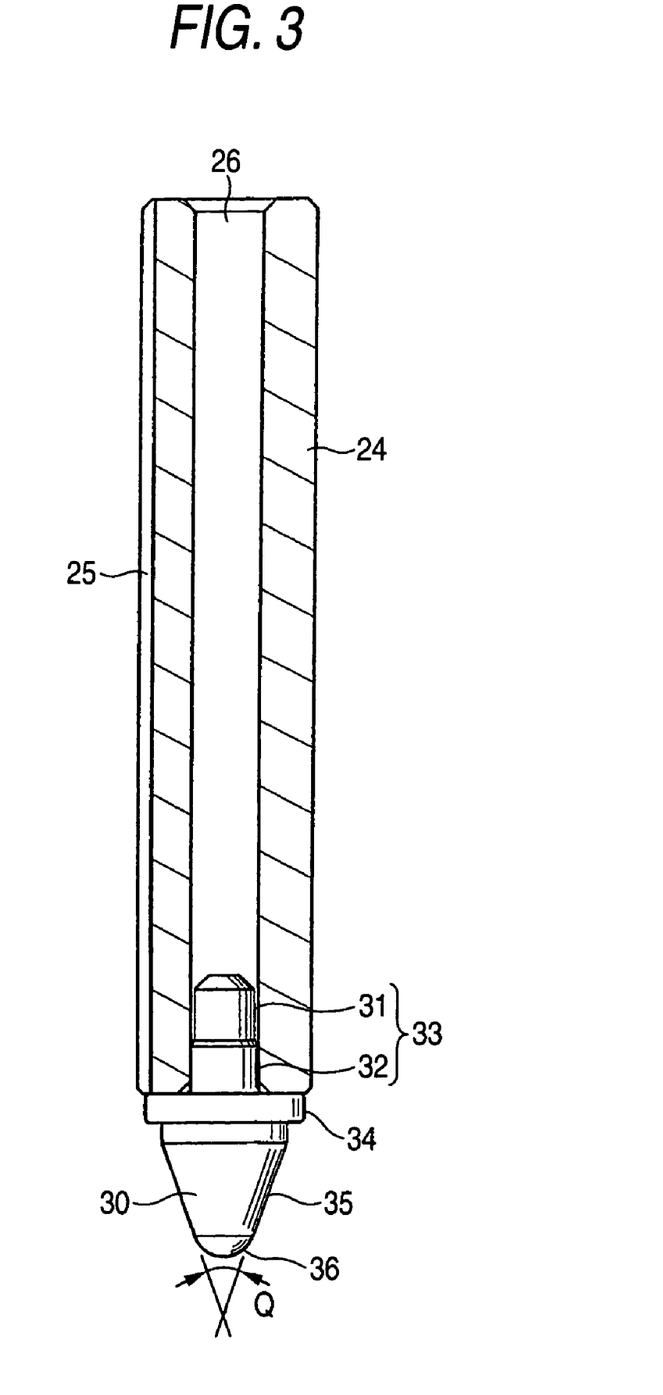
FIG. 3 is a vertical cross-sectional view showing a different example of a retainer.
Figure 4:
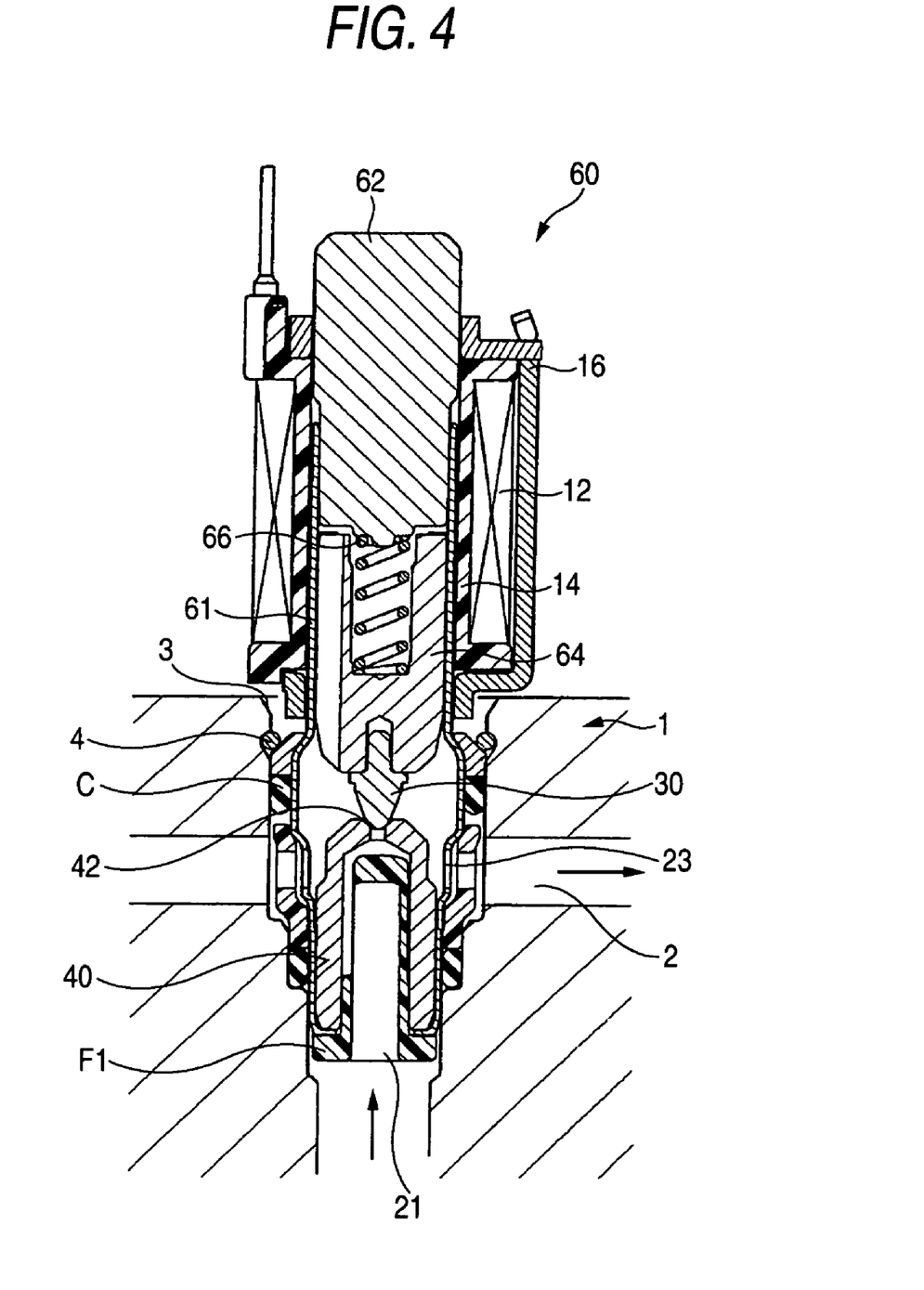
FIG. 4 is a vertical cross-sectional view showing a normally close type electromagnetic valve according to an embodiment of the present invention.

FIG. 1 is a vertical cross-sectional view showing a normally open type electromagnetic valve according to an embodiment of the present invention. FIG. 2A is an enlarged vertical cross-sectional view showing a valve element and a valve seat. FIG. 2B is an enlarged vertical cross-sectional view showing a valve element that has surfaces having first and second opening angle. FIG. 3 is a vertical cross-sectional view showing a different example of a retainer. FIG. 4 is a vertical cross-sectional view showing a normally close type electromagnetic valve according to an embodiment of the present invention.

The normally open type electromagnetic valve 10 according to the embodiment of the present invention shown in FIG. 1 can be employed, for example, for opening and closing a hydraulic fluid passage in an ABS (antilock braking system) for an automobile. The normally open type electromagnetic valve 10 may be partly inserted into a mounting bore 3 provided in a base material, for example made of aluminum, and fastened by an annular fastener 4. The normally open type electromagnetic valve 10 is provided with a fixed core 20 fluid-tightly sealed with respect to the base material 1 by a plurality of annular sealing materials C, a retainer 24 that serves as a plunger, enclosed in a valve bore 22 axially penetrating through the fixed core 20, a movable core 28 for press-moving the retainer 24, and a coil 12 for adsorbing the movable core 28 to the fixed core 20.

The fixed core 20 is a substantially cylindrical component made of a magnetic material such as iron or an iron alloy. The fixed core 20 is provided with a first opening 21 and a second opening 23 respectively communicating with a hydraulic fluid passage 2 formed in the base material 1, and a first filter F1 is attached to the first opening 21. At an open-end portion of the valve bore 22 of the fixed core 20 on the side of the first opening 21, a cylindrical valve seat element 40 is fixed by fitting. To a portion of the fixed core 20 protruding above an upper face of the base material 1, a guide cylinder 18 in a shape of a cylinder with a bottom is fixed by welding, and the coil 12 wound on a bobbin 14 made of a synthetic resin as well as a coil case 16 enclosing the coil 12 are attached.

The retainer 24 is of a circular column shape, and is movably disposed inside the valve bore 22 axially penetrating through the fixed core 20. A valve element 30 of a generally conical shape is fixed at a tip portion of the retainer 24, while the movable core 28, for example made of an iron-based metal, enclosed in the guide cylinder 18 is disposed in contact with the other end portion of the retainer 24. A detailed structure of the tip portion of the retainer 24 is shown in FIG. 2A. A fluid groove 25 is formed on an outer circumferential surface of the retainer 24, so that the hydraulic fluid can pass therethrough. In a recessed joint portion 26 having a circular cross-section formed at the tip portion of the retainer 24, a joint shaft portion 33 of the valve element 30 is fixed by press fitting. Since the retainer 24 and the valve element 30 are separately formed, the valve element 30 which has to have a high hardness and the retainer 24 to be preferably formed of a non-magnetic material can be made of different materials. Also, since the retainer 24 and the valve element 30 are independently processed, high-precision processing required for the respective components can be performed.

The valve element 30 includes a joint shaft portion 33 of a circular column shape, an annularly protruding flange portion 34, an expanding diameter portion 35 of a truncated conical shape, and a sealing portion 36 of a generally semi-spherical shape formed at a tip portion of the expanding diameter portion 35. The joint shaft portion 33 includes a press-fitting portion 32 and a guide portion 31 having a slightly smaller outer diameter than the press-fitting portion 32, so that the press-fitting process of the valve element 30 into the retainer 24 is facilitated by first inserting the guide portion 31 of a smaller diameter into the retainer 24. Since a maximum diameter of the joint shaft portion 33 is made smaller than that of the expanding diameter portion 35, an error of inserting the expanding diameter portion 35 into the joint portion 26 can be prevented, when mounting the valve element 30. The valve element 30 to be inserted until the flange portion 34 makes contact with the retainer 24. In this press-fitting process, the flange portion 34 offers an advantage of improved work efficiency, because a press-fitting jig can be applied to a face of the flange portion 34 on the side of the sealing portion 36. Also, upon mounting the retainer 24 in the normally open type electromagnetic valve 10, the flange portion 34 of the valve element 30 serves as a contact face of a seat spring 50 which is the biasing member.

The valve seat element 40 has a substantially cylindrical shape, and includes a first seat element opening 44 of a smaller diameter and a second seat element opening 46 of a larger diameter. The second seat element opening 46 is fixed by fitting to the valve bore 22 of the fixed core 20 so as to confront the first opening 21 of the fixed core 20. The first seat element opening 44 of the valve seat element 40 is provided with a valve seat 42 on which the sealing portion 36 of the valve element 30 is to be seated. The valve seat 42 is structured of a tapered surface expanding toward an outer circumference of the valve seat element 40, so that the first seat element opening 44 is closed once the sealing portion 36 provided at a tip portion of the valve element 30 makes contact with the valve seat 42.

Referring to the sealing portion 36 of the valve element 30, which has a substantially semi-spherical shape as shown in FIG. 2A, a shape of a portion to make contact with the valve seat 42 is critically important, since such a portion constitutes the seating area. Accordingly, the portion of the sealing portion 36 to make contact with the valve seat 42 is to be precisely formed in an arc shape having a vertical cross-section strictly according to specification, while a tip of the sealing portion 36 does not have to have an arc-shaped cross-section. Also the expanding diameter portion 35, which is formed in a tapered face having an increased diameter in a direction from the tip of the sealing portion 36 having an arc-shaped vertical cross-section toward the flange portion 34, may also be of tapered surfaces 35' 35" having a plurality of opening angles Q (as shown in FIG. 2B) or of an arc-shape of a large radius, within an extent where a smooth flow of the hydraulic fluid can be ensured. It is preferable to set an opening angle Q (as shown in FIG. 3) of the tapered surface of the expanding diameter portion 35 at, for example, 40 degrees.

Such a shape of the valve element 30 from the sealing portion 36 along the expanding diameter portion 35 can reduce operational noise originating from a flow separation phenomenon of the hydraulic fluid flowing in through the first seat element opening 44. Also, the smooth flow of the hydraulic fluid from the sealing portion 36 of the valve element 30 along the expanding diameter portion 35 prevents the retainer 24 from swinging in a direction orthogonal to a moving direction thereof, thereby reducing undesirable variation of hydraulic fluid pressure applied to the sealing portion 36. Such an effect permits appropriate control of the fluid pressure when controlling the fluid pressure by adjusting the coil current so as to control relief pressure of the valve element and the valve seat, because seating the valve element on the valve seat with high precision results in stabilization of the fluid pressure applied to the valve element.

Now operation of the normally open type electromagnetic valve according to this embodiment will be described. While current is not supplied to the coil 12, the valve element 30 and the retainer 24 are separated from the valve seat 42 by the seat spring 50, as shown in FIG. 1. Accordingly, under such a normal state the hydraulic fluid flows from the first opening 21 through the first valve seat element opening 44 toward the second opening 23. When the coil 12 is excited by a current supply, the movable core 28 is attracted toward the fixed core 20 and pushes an end portion of the retainer 24, and when the attracting force surpasses a force of the seat spring 50 and a flow pressure of the hydraulic fluid the valve element 30 is seated on the valve seat 42 to close the fluid passage.

FIG. 3 is a vertical cross-sectional view showing a different example of a retainer 24. The retainer 24 is provided with a through hole axially penetrating therethrough. The through hole is provided with a joint portion 26 at both ends thereof, to which the valve element 30 can be press-fitted, and the joint portions 26 have a symmetrical shape with respect to an axial center of the retainer. By providing such joint portions 26 of a symmetrical shape at both ends of the retainer 24, a process of identifying an end portion where the joint portion 26 is formed can be omitted when assembling a retainer 24 which is a small-sized component, and consequently the assembly process can be simplified.

Now referring to FIG. 4, a normally close type electromagnetic valve 60 according to an embodiment of the present invention will be described. Hereunder, the same components as those of the normally open type electromagnetic valve 10 are given identical numerals.

The normally close type electromagnetic valve 60 is inserted into a mounting bore 3 of a base material 1 such that approximately half a portion of its cylindrical body 61 having a thin wall thickness is located inside the base material 1, and is fluid-tightly sealed by a plurality of annular sealing materials C and fixed by a fastener 4 to avoid falling off. The body 61 is provided with a first opening 21 and a second opening 23 respectively communicating with a hydraulic fluid passage 2 formed in the base material 1, and a first filter F1 is attached to the first opening 21. At an open-end portion of the body 61 on the side of the first opening 21, a cylindrical valve seat element 40 is press-fitted. To a portion of the body 61 protruding above an upper face of the base material 1, a coil 12 wound around a bobbin 14 made of a synthetic resin as well as a coil case 16 enclosing the coil 12 are attached. Also, a fixed core 62 made of a magnetic material is welded to an inner top portion of the body 61 protruding above an upper face of the base material 1, and a movable core 64 serving as a plunger is movably disposed under the fixed core 62 via a biasing member such as a spring 66.

The movable core 64 is provided with a recess at an end portion thereof, in which the spring 66 is disposed, and into the other end portion the valve element 30 is press-fitted. Since the joint structure of the movable core 64 and the valve element 30, as well as the structure of the valve element 30 are identical with that of the retainer 24 and the valve element 30 of the normally open type electromagnetic valve 10, the description thereof will be omitted.

Operation of the normally close type electromagnetic valve 60 according to this embodiment will now be described. While current is not supplied to the coil 12, the valve element 30 and the movable core 64 are disposed such that the valve element 30 remains in contact with the valve seat 42 because of the seat spring 66, as shown in FIG. 4. Accordingly, under such a normal state the hydraulic fluid cannot flow since the first opening 21 and the second opening 23 are not communicating with each other. When the coil 12 is excited by a current supply, the movable core 64 is attracted toward the fixed core 62 against a pressure of the spring 66, and consequently the valve element 30 is separated from the valve seat 42. As a result, the hydraulic fluid can flow from the first opening 21 toward the second opening 23 when current is supplied to the coil 12.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

For example, though the seat spring 50 and the spring 66 are employed as the biasing member in the embodiments, various elastic materials may be adopted as the case may be.

According to the first aspect of the present invention, since the valve element of the electromagnetic valve includes a sealing portion having an arc-shaped vertical cross section and an expanding diameter portion having its diameter gradually increasing, the valve element has a tapered face toward a tip portion thereof with respect to the plunger. Therefore, a seating area diameter of the valve element-on the valve seat can be made smaller than in a conventional electromagnetic valve. Especially, elimination of the fixed portion, which may interfere with the valve seat, from the proximity of the sealing portion is effective in reducing the seating area diameter. Reducing the seating area diameter permits reduction of a driving force to move the valve element back and forth, thereby achieving miniaturization of a coil and reduction in power consumption through the coil. Also, a shape of the expanding diameter portion, which has a gradually increasing diameter in a direction from the sealing portion toward the plunger, permits smooth flow of a hydraulic fluid, and resultantly prevents flow separation which causes fluidic operational noise.

Also, the smooth flow of the hydraulic fluid applied to the valve element prevents the plunger from swinging in a direction orthogonal to a moving direction thereof, thereby reducing undesirable variation of hydraulic fluid pressure applied to the valve element, which may be caused by the swinging motion of the plunger. Such an effect offers an additional advantage of ensuring appropriate control of the fluid pressure when controlling the fluid pressure by adjusting the coil current so as to control relief pressure of the valve element and the valve seat, because seating the valve element on the valve seat with high precision results in stabilization of the fluid pressure applied to the valve element.

According to the second aspect of the present invention, owing to adopt a tapered surface in the expanding diameter portion, it is easy to process the valve element even when dimensions thereof are minute, and it assures smooth flow of the hydraulic fluid from the sealing portion along the expanding diameter portion, thereby preventing flow separation which causes fluidic operational noise.

Also, the smooth flow of the hydraulic fluid applied to the valve element prevents the plunger from swinging in a direction orthogonal to a moving direction thereof, thereby reducing undesirable variation of hydraulic fluid pressure applied to the valve element, which may be caused by the swinging motion of the plunger. Such an effect offers an additional advantage of ensuring appropriate control of the fluid pressure when controlling the fluid pressure by adjusting the coil current so as to control relief pressure of the valve element and the valve seat, because seating the valve element on the valve seat with high precision results in stabilization of the fluid pressure applied to the valve element.

According to the third aspect of the present invention, such a structure permits independent manufacturing of the valve element and the plunger, so that the joint shaft portion of the valve element can be subsequently unified with the joint portion of the plunger by press fitting. For a normally open type electromagnetic valve for example, a valve element that has to have certain hardness and a retainer of a non-magnetic material can be constituted of different materials. Also, the flange portion can be utilized for applying a pressing force to the valve element when press-fitting it into the plunger, even when the valve element is very small.

According to the fourth aspect of the present invention, such a structure can prevent an error of inserting the expanding diameter portion instead of the joint shaft portion into the plunger, when press-fitting a small valve element into the plunger.

According to the fifth aspect of the present invention, such a structure permits reducing a seating area diameter of a valve element provided in a retainer of a normally open type electromagnetic valve.

According to the sixth aspect of the present invention, as a result of such structure, since joint portions of an identical shape are provided at both ends of the retainer, a process of checking an orientation of the retainer can be omitted when press-fitting a valve element. Therefore, the press-fitting process of the valve element into the retainer can be simplified, and also an error of mounting a valve element at an end where a joint portion is not provided can be prevented.

According to the seventh aspect of the present invention, such structure permits reducing a seating area diameter of a valve element provided in a retainer of a normally close type electromagnetic valve.

What is claimed is:

1. An electromagnetic valve comprising:
    a valve seat;
    a valve element movable relative to the valve seat so as to open or close a hydraulic fluid passage interposed therebetween; and
    a plunger movable together with the valve element relative to the valve seat,
    wherein the valve element includes
        a sealing portion having an arc-shaped vertical cross section that contacts with the valve seat; and
        an expanding diameter portion having a diameter gradually increasing starting from the sealing portion toward the plunger,
    wherein at least one area of the expanding diameter portion has a diameter greater than a maximum diameter of a joint shaft portion of the valve element.

2. The electromagnetic valve as set forth in claim 1, wherein the expanding diameter portion of the valve element has a tapered surface having a diameter increasing in a direction from the sealing portion toward the plunger.

3. The electromagnetic valve as set forth in claim 1, wherein
    the plunger includes a joint portion opened at a tip portion thereof, and
    the valve element further includes
        the joint shaft portion press-fitted into the joint portion; and
        a flange portion that protrudes radial direction and is located between the joint shaft portion and the expanding diameter portion.

4. The electromagnetic valve as set forth in claim 3, wherein the maximum diameter of the joint shaft portion is smaller than a maximum diameter of the expanding diameter portion.

5. The electromagnetic valve as set forth in claim 1, wherein the electromagnetic valve is a normally open type electromagnetic valve including:
    a conductive coil;

a fixed core to be excited upon supplying current to the coil;
a movable core that is adsorbed to the fixed core upon supplying current to the coil; and
a biasing member located between the valve seat and the valve element,
wherein the plunger serves as a retainer that slides along a valve bore penetrating through the fixed core,
the valve element is normally separated from the valve seat by the biasing member, and
the valve element contacts with the valve seat when the retainer is pressed by the adsorption of the movable core.

6. The electromagnetic valve as set forth in claim 5, wherein the retainer includes:
a through hole that penetrates axially therethrough; and
joint portions formed at the both ends of the through hole, each joint portion capable of coupling with the valve element,
wherein the joint portions are symmetrical to an axial center of the retainer.

7. The electromagnetic valve as set forth in claim 1, wherein the electromagnetic valve is a normally closed type electromagnetic valve including:
a conductive coil;
a fixed core to be excited upon supplying current to the coil; and
a biasing member disposed between the movable core and the fixed core,
wherein the plunger serves as a movable core,
the valve element is normally in contact with the valve seat by the biasing member, and
the valve element is separated from the valve seat when the movable core is adsorbed to the fixed core by supplying current to the coil.

8. The electromagnetic valve as set forth in claim 1, wherein the plunger is made of a first material, and the valve element is made of a second material that is different from the first material.

9. The electromagnetic valve as set forth in claim 1, wherein the expanding diameter portion of the valve element has an arc-shaped surface having a various diameter increasing in a direction from the sealing portion toward the plunger.

10. The electromagnetic valve as set forth in claim 2, wherein the tapered surface comprises tapered surfaces having a plurality of opening angles.

11. The electromagnetic valve as set forth in claim 2, wherein an opening angle of the tapered surface is 40 degrees.

12. The electromagnetic valve as set forth in claim 5, wherein
the plunger includes a joint portion opened at a tip portion thereof, and
the valve element further includes
the joint shaft portion press-fitted into the joint portion; and
a flange portion that protrudes radial direction thereof and is located between the joint shaft portion and the expanding diameter portion,
wherein a surface of the flange portion that opposes to the valve seat contacts with the biasing member.

13. An electromagnetic valve comprising:
a valve seat;
a valve element movable relative to the valve seat so as to open or close a hydraulic fluid passage interposed therebetween; and
a plunger movable together with the valve element relative to the valve seat,
wherein the valve element includes:
a sealing portion having an arc-shaped vertical cross section that contacts with the valve seat;
an expanding diameter portion of a truncated conical shape located directly adjacent the sealing portion;
a joint shaft portion received in the plunger; and
a radially protruding flange portion located between the joint shaft portion and the expanding diameter portion, and in contact with a bottom surface of the plunger.

14. The electromagnetic valve of claim 13, further comprising a biasing member located between the valve seat and the valve element, and contacting the flange portion.

15. The electromagnetic valve of claim 13, wherein the electromagnetic valve is a normally open type electromagnetic valve including:
a conductive coil;
a fixed core to be excited upon supplying current to the coil;
a movable core that is adsorbed to the fixed core upon supplying current to the coil; and
a biasing member located between the valve seat and the valve element,
wherein the plunger serves as a retainer that slides along a valve bore penetrating through the fixed core,
the valve element is normally separated from the valve seat by the biasing member, and
the valve element contacts with the valve seat when the retainer is pressed by the adsorption of the movable core.

16. The electromagnetic valve as set forth in claim 15, wherein the retainer includes:
a through hole that penetrates axially therethrough; and
joint portions formed at the both ends of the through hole, each joint portion capable of coupling with the valve element, wherein the joint portions are symmetrical to an axial center of the retainer.

17. The electromagnetic valve of claim 13, wherein the electromagnetic valve is a normally closed type electromagnetic valve including:
a conductive coil;
a fixed core to be excited upon supplying current to the coil; and
a biasing member disposed between a movable core and the fixed core,
wherein the plunger serves as the movable core,
the valve element is normally in contact with the valve seat by the biasing member, and
the valve element is separated from the valve seat when the movable core is adsorbed to the fixed core by supplying current to the coil.

18. The electromagnetic valve of claim 13, wherein at least one area of the expanding diameter portion has a diameter greater than a maximum diameter of the joint shaft portion.

19. The electromagnetic valve as set forth in claim 13, wherein the plunger is made of a first material, and the valve element is made of a second material that is different from the first material.

20. The electromagnetic valve as set forth in claim 13, wherein the expanding diameter portion comprises tapered surfaces having a plurality of opening angles.

* * * * *